(12) United States Patent
Okumura

(10) Patent No.: US 8,254,623 B2
(45) Date of Patent: Aug. 28, 2012

(54) IMAGE DISPLAY DEVICE

(75) Inventor: Tsuyoshi Okumura, Higashiosaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 357 days.

(21) Appl. No.: 12/765,200

(22) Filed: Apr. 22, 2010

(65) Prior Publication Data

US 2010/0272307 A1 Oct. 28, 2010

(30) Foreign Application Priority Data

Apr. 24, 2009 (JP) ................................ 2009-106302

(51) Int. Cl.
*H04R 1/02* (2006.01)
(52) U.S. Cl. ......................................................... 381/388
(58) Field of Classification Search ................... 381/388
See application file for complete search history.

(56) References Cited

U.S. PATENT DOCUMENTS

| 5,920,637 A | * | 7/1999 | Jeon | 381/388 |
| 6,807,053 B2 | * | 10/2004 | An et al. | 361/679.55 |
| 7,576,983 B2 | * | 8/2009 | Yamaguchi et al. | 361/679.55 |
| 2006/0187364 A1 | * | 8/2006 | Fukano | 348/836 |
| 2009/0116679 A1 | * | 5/2009 | Kameoka | 381/388 |

FOREIGN PATENT DOCUMENTS

| JP | 3048394 U | | 5/1998 |
| JP | 3059695 U | | 7/1999 |
| JP | 2003180954 A | * | 7/2003 |
| JP | 2009-53399 A | | 3/2009 |

* cited by examiner

*Primary Examiner* — Jianchun Qin
(74) *Attorney, Agent, or Firm* — Westerman, Hattori, Daniels & Adrian, LLP

(57) ABSTRACT

An image display device includes a housing including a front cabinet and a back cabinet. Inside the housing, arranged are a flat display panel, a speaker which emits voice forward, and a circuit board which displays an image on the flat display panel and transmits an audio signal to the speaker. Here, the flat display panel is attached to the front cabinet while the speaker and the circuit board are attached to the back cabinet. A sound emitting hole through which an acoustic wave from the speaker should pass is formed in at least a part of a region surrounding a display screen of the flat display panel on a front surface of the front cabinet, and the speaker has such a posture that a sound emitting surface thereof is inclined with respect to the display screen of the flat display panel and faces outside of the display screen.

4 Claims, 10 Drawing Sheets

IMAGE DISPLAY DEVICE

The application Number 2009-106302, upon which this patent application is based, is hereby incorporated by reference.

BACKGROUND OF THE INVENTION

1. Field of the Invention

The present invention relates to an image display device comprising a flat display panel such as a liquid crystal display panel, a plasma display panel or the like, and a speaker.

2. Description of Related Art

The image display device of this kind includes a flat display panel, a speaker which emits voice forward, and a circuit board which displays an image on the flat display panel and transmits an audio signal to the speaker, which are arranged inside a housing comprising a front cabinet and a back cabinet.

In conventional image display devices, the speaker is fixed to a rear surface of the front cabinet.

The above described image display device is manufactured by performing a first component attachment step of attaching various components such as the flat display panel and the like to the front cabinet, a second component attachment step of attaching various components such as the circuit board and the like to the back cabinet, and a housing forming step of combining the front cabinet and the back cabinet to form the housing. Here, in the housing forming step, required is a complicated work for connecting the various components on the front cabinet side (mainly the flat display panel) and the various components on the back cabinet side (mainly the circuit board) to each other via a lead wire.

Also, in the conventional image display device, the speaker is fixed with its sound emitting surface parallel to a display screen of the flat display panel. Therefore, a width (or area) of a region where sound emitting holes are formed on a front surface of the front cabinet increases, and a proportion of the area occupied by the display screen on the front surface of the housing thereby decreases.

In order to address this problem, conventionally, it has been proposed to attach the speaker to the front cabinet with the sound emitting surface facing obliquely downward. Specifically, the speaker is provided with a frame for attaching the speaker to the front cabinet, and the frame includes a flat section parallel to the sound emitting surface of the speaker and a bent section which bends at a predetermined angle with respect to the flat section. The bent section is screwed to a side wall of the front cabinet.

By attaching the speaker to the front cabinet with the sound emitting surface inclined, the width (or area) of the region where the sound emitting holes are formed decreases, and the proportion of the area occupied by the display screen on the front surface of the housing thereby increases.

However, in the conventional image display device, since the speaker is fixed to the front cabinet side as described above, in the above-mentioned housing forming step, required is a complicated work of connecting the speaker on the front cabinet side and the circuit board on the back cabinet side to each other via the lead wire. Because of this, there has been a problem of lower workability at the time of manufacturing the image display device.

Also, in the above described image display device in which the sound emitting surface of the speaker faces obliquely downward, since the frame provided to the speaker is bent at a predetermined angle, required is a change in inclination angle of the bent section with respect to the flat section of the frame for each image display device with different direction of the sound emitting surface of the speaker. Because of this, there has been a problem of increase in cost due to poor versatility of the speaker.

SUMMARY OF THE INVENTION

An object of the present invention is to provide an image display device in which a proportion of the area occupied by the display screen of the flat display panel on a front surface of the housing is large and workability at the time of manufacture is high.

A image display device according to the present invention comprises a housing comprising a front cabinet and a back cabinet, a flat display panel arranged inside the housing, a speaker which is arranged inside the housing and emits voice forward, and a circuit board which is arranged inside the housing and which displays an image on the flat display panel and transmits an audio signal to the speaker. Here, the flat display panel is attached to the front cabinet while the speaker and the circuit board are attached to the back cabinet. A sound emitting hole through which an acoustic wave from the speaker should pass is formed in at least a part of a region surrounding a display screen of the flat display panel on a front surface of the front cabinet, and the speaker has such a posture that a sound emitting surface thereof is inclined with respect to the display screen of the flat display panel and faces outside of the display screen.

DETAILED DESCRIPTION OF THE PREFERRED EMBODIMENT

Figure 1:
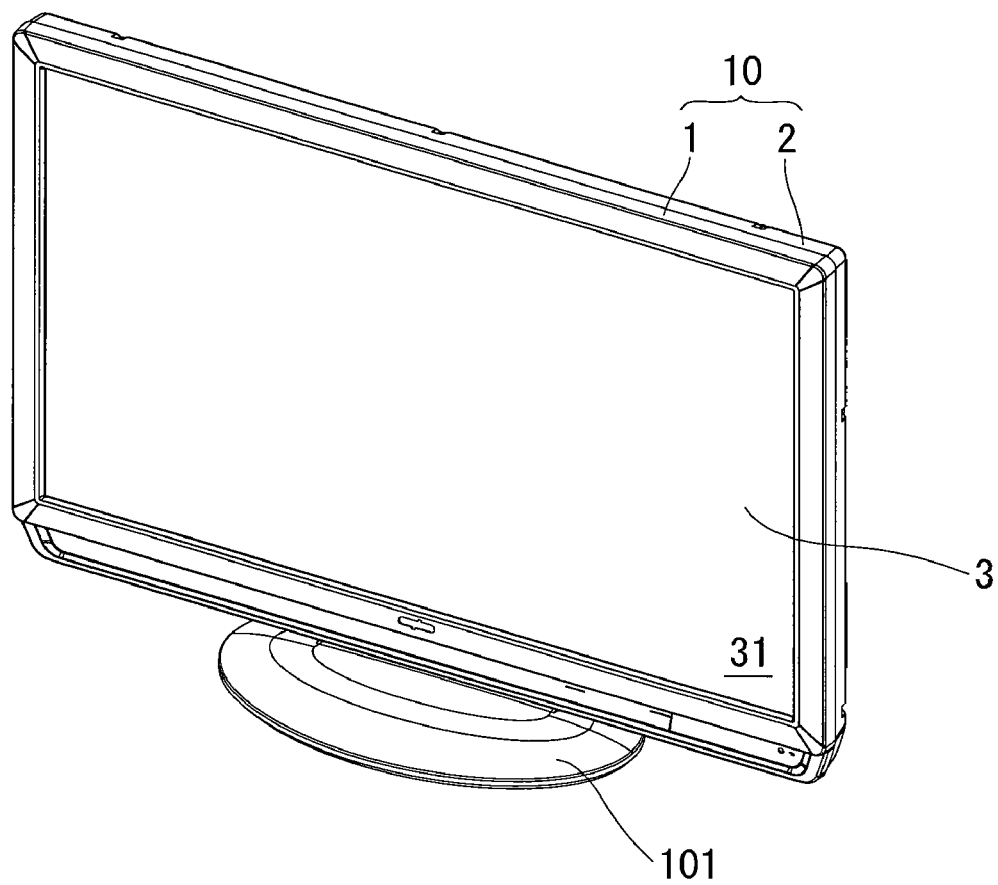
FIG. 1 is a perspective view showing a liquid crystal display television receiver according to one embodiment of the present invention.

A first image display device according to the present invention comprises a housing comprising a front cabinet and a back cabinet, a flat display panel arranged inside the housing, a speaker which is arranged inside the housing and emits voice forward, and a circuit board which is arranged inside the housing and which displays an image on the flat display panel and transmits an audio signal to the speaker. Here, the flat display panel is attached to the front cabinet while the speaker and the circuit board are attached to the back cabinet. A sound emitting hole through which an acoustic wave from the speaker should pass is formed in at least a part of a region surrounding a display screen of the flat display panel on a front surface of the front cabinet, and the speaker has such a posture that a sound emitting surface thereof is inclined with respect to the display screen of the flat display panel and faces outside of the display screen.

The first image display device described above is manufactured by performing a first component attachment step of attaching various components such as the flat display panel and the like to the front cabinet, a second component attachment step of attaching various components such as the circuit board and the like to the back cabinet, and a housing forming step of combining the front cabinet and the back cabinet to form the housing. Here, in the housing forming step, required is a complicated work for connecting the various components on the front cabinet side (mainly the flat display panel) and the various components on the back cabinet side (mainly the circuit board) to each other via a lead wire.

On the other hand, in the first image display device described above, the speaker is attached to the back cabinet in the second component attachment step. Therefore, in this step, it is possible to connect the speaker and the circuit board to each other by the lead wire. Thus, according to the first image display device described above, the number of works required in the housing forming step decreases, and workability at the time of manufacturing the image display device improves in comparison with the conventional image display device in which the speaker is attached to the front cabinet.

Also, in the first image display device described above, the speaker has such a posture that the sound emitting surface thereof is inclined with respect to the display screen of the flat display panel and faces outside of the display screen. Therefore, a width of the sound emitting surface apparently decreases in a direction from an edge of the display screen toward outside along the front surface of the housing. Thus, a width of the region where the sound emitting hole is formed along said direction can be reduced, and as a result, the area of the region where the sound emitting hole is formed is reduced, and the proportion of the area occupied by the display screen on the front surface of the housing increases.

A second image display device according to the present invention is the first image display device described above, wherein the speaker is provided with a frame for attaching the speaker to the back cabinet, one or more bosses for fixing the frame project on an inner surface of the back cabinet toward the front cabinet side, a screw passes through the frame and is screwed into each boss, a tip end surface of the boss is inclined with respect to a screw-in direction of the screw and faces outside of the display screen of the flat display panel.

In the second image display device described above, the tip end surface of the boss for fixing the frame provided to the speaker is inclined with respect to the screw-in direction of the screw and faces outside of the display screen of the flat display panel. Therefore, even if the frame provided to the speaker is not bent at a predetermined angle like in the conventional image display device, the speaker fixed to the boss has such a posture that the sound emitting surface thereof is inclined with respect to the display screen of the flat display panel. Therefore, versatility of the speaker improves, and as a result, cost can be reduced.

A third image display device according to the present invention is the second image display device described above, wherein between facing surfaces of a head of the screw and the frame to each other, a spacer including surface regions to be in surface contact with both the facing surfaces intervenes.

The frame placed on the tip end surface of the boss has a facing surface to the head of the screw, and this facing surface is inclined to the screw-in direction of the screw. Therefore, in a case where there is no spacer in the above described image display device, an edge of the head of the screw is in point contact or line contact with the facing surface of the frame. Therefore, a screwing force of the screw is transmitted disproportionately to the frame around the screw, and a part of the frame might thereby rise from the tip end surface of the boss.

However, in the third image display device described above, the spacer intervenes between the facing surfaces of the head of the screw and the frame to each other, and surfaces of the spacer are in surface contact with these facing surfaces. Therefore, the screwing force of the screw is transmitted to the frame equally through the spacer around the screw. Thus, the speaker can be fixed to the boss with the frame in surface contact with the tip end surface of the boss.

A fourth image display device according to the present invention is the second or third image display device described above, wherein a rib to be abutted by a part of an outer edge surrounding the sound emitting surface of the speaker is formed on the inner surface of the back cabinet, and the speaker is screwed to the boss at a position opposite to the rib.

In a case where the speaker is screwed to the boss at a position only on one side like in the fourth image display device described above, a portion of the speaker on the opposite side to the screwing position will rise from the position where the speaker should be fixed.

However, by providing the rib as described above, a part of the outer edge surrounding the sound emitting surface of the speaker abuts on the rib, and therefore, the speaker is restrained from rising by the rib. Accordingly, the number of screws required for the fixation of the speaker decreases, and as a result, workability at the time of attachment of the speaker to the back cabinet improves.

A fifth image display device according to the present invention is any one of the first to fourth image display devices described above, wherein a tube section including an inner space communicated with the sound emitting hole projects on a rear surface of the front cabinet, and an open-end tip end surface of the tube section is in close contact with an outer edge part surrounding the sound emitting surface of the speaker.

According to the fifth image display device described above, since the open-end tip end surface of the tube section is in close contact with the outer edge part surrounding the sound emitting surface of the speaker, a large part of an acoustic wave emitted from the sound emitting surface is transmitted to the sound emitting hole through the inner space of the tube section, and is emitted forward from the sound emitting hole.

A sixth image display device according to the present invention is the fifth image display device described above, wherein at least one pair of bosses for fastening both the cabinets in combination projects on both sides of attachment position of the speaker on an inner surface of either of the front cabinet and the back cabinet, and screws pass through the other cabinet, and are screwed into the pair of bosses respectively.

According to the sixth image display device described above, by using fastening power of both cabinets by screwing, it is possible to improve the closeness of the contact between the open-end tip end surface of the tube section projecting on the rear surface of the front cabinet and the outer edge part surrounding the sound emitting surface of the speaker. As a result, the acoustic wave from the speaker is transmitted to the sound emitting hole with very little leak from the tube section, and is emitted forward from the sound emitting hole.

In a preferred embodiment discussed in detail below with reference to drawings, the present invention is implemented in a liquid crystal display television receiver.

As shown in FIG. 1, a liquid crystal display television receiver according to one embodiment of the present invention includes a casing 10 comprising a front cabinet 1 and a back cabinet 2, and the casing 10 is capable of self-standing by means of a stand 101.

Figure 2:
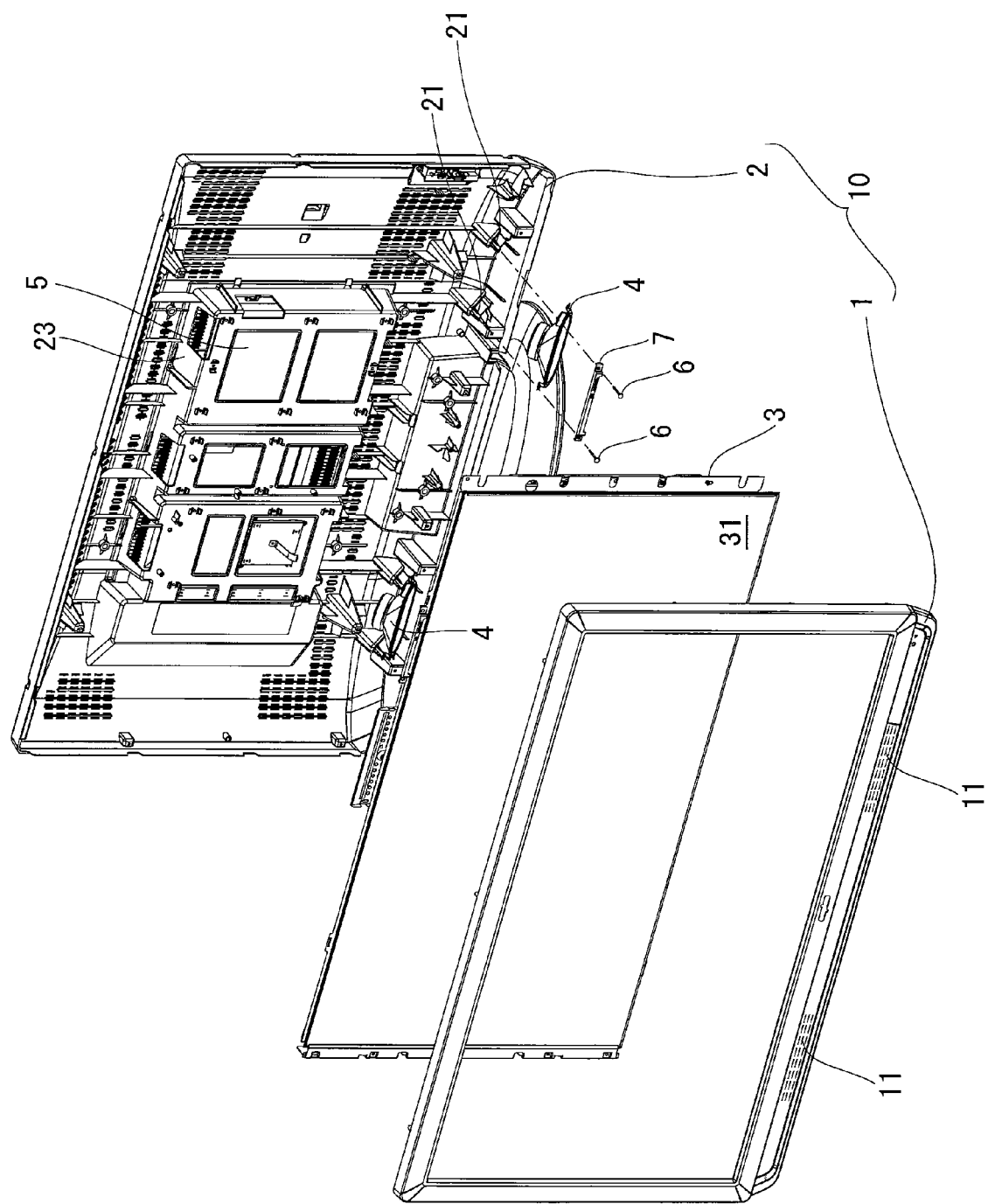
FIG. 2 is an exploded perspective view of the liquid crystal display television receiver viewed from a front surface side.
Figure 3:
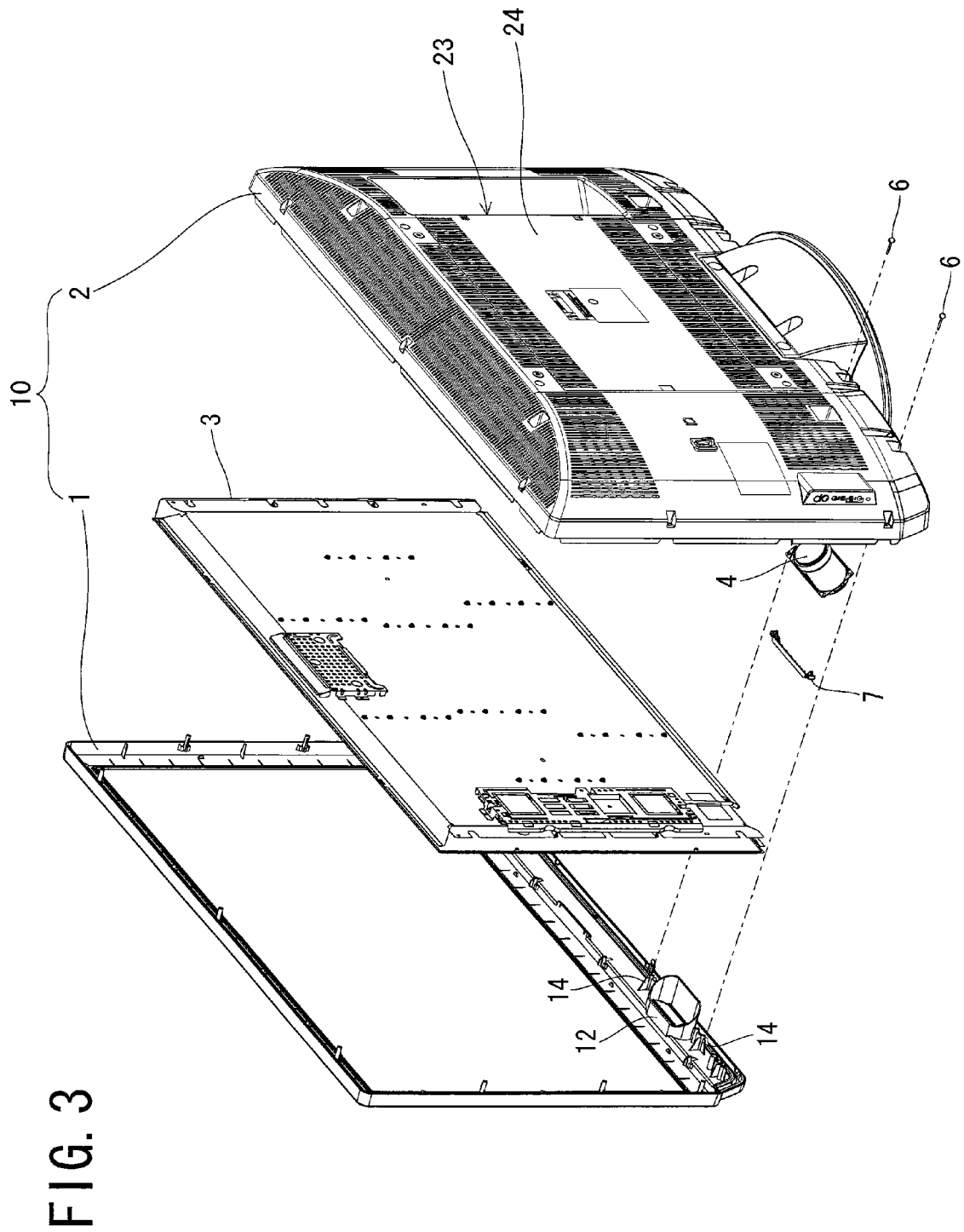
FIG. 3 is an exploded perspective view of the liquid crystal display television receiver viewed from a rear side.

Inside the housing 10, as shown in FIGS. 2 and 3, arranged are a liquid crystal display panel 3, a pair of speakers 4, 4 which emit voice toward the front of the housing 10, and a circuit board 5 which displays an image on the liquid crystal display panel 3 and transmits an audio signal to the pair of speakers 4, 4.

The liquid crystal display panel 3 is a flat display panel including a display screen 31 which can be viewed from the front of the housing 10, and is attached to a rear surface of the front cabinet 1.

In contrast, the speakers 4, 4 are attached to an inner surface of the back cabinet 2 at right and left positions near a lower end of the liquid crystal display panel 3, respectively. Also, the circuit board 5 is accommodated in a storage chamber 23 provided in the rear surface of the back cabinet 2, and the storage chamber 23 is covered by a cover member 24.

The liquid crystal display panel 3 and the pair of speakers 4, 4 are connected to the circuit board 5 via a lead wire (not shown).

Figure 4:
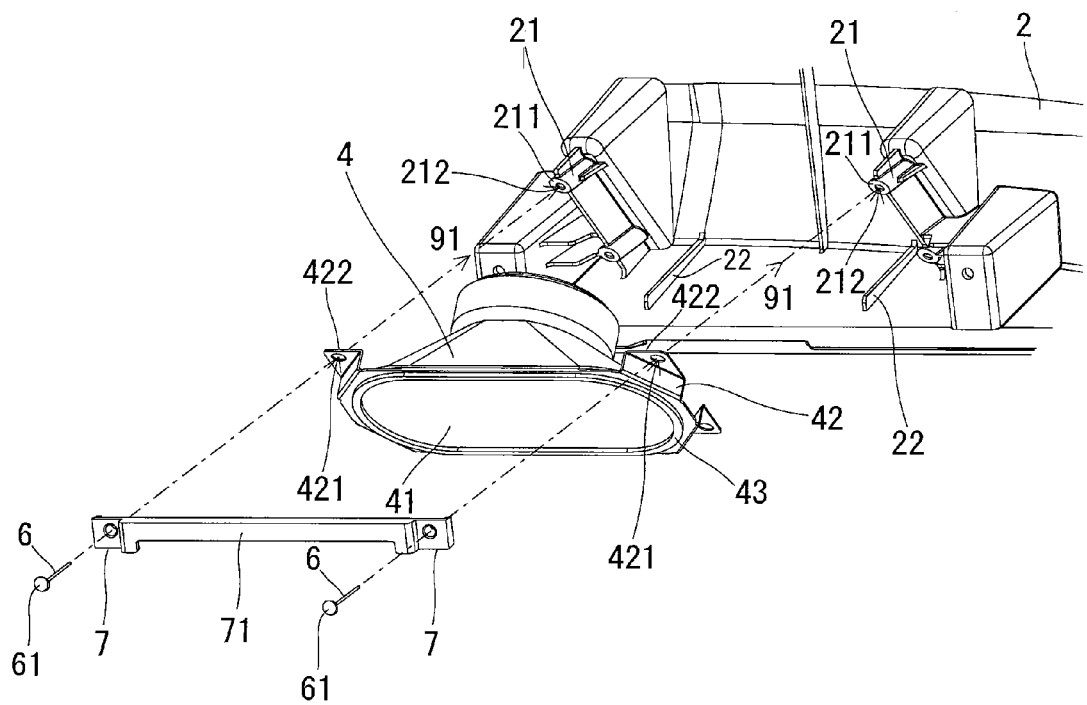
FIG. 4 is an exploded perspective view for explaining attachment of a speaker included in the liquid crystal display television receiver.

As shown in FIG. 4, each speaker 4 is provided with a frame 42 for attaching the speaker 4 to the back cabinet 2, and a right and left pair of bosses 21, 21 for fixing the frame 42 provided to each speaker 4 projects on an inner surface of the back cabinet 2 toward the front cabinet 1 side.

The frame 42 provided to each speaker 4 is comprised by a thin board member made of metal, and the frame 42 is provided with a through-hole 421 at right and left positions near an upper end of a sound emitting surface 41 of the speaker 4. A screw 6 should pass through the through-hole 421. Also, an attaching surface 422 which is a plane generally parallel to the sound emitting surface 41 of the speaker 4 is formed in at least a region surrounding the through-hole 421 on a rear surface of the frame 42.

Figure 5:
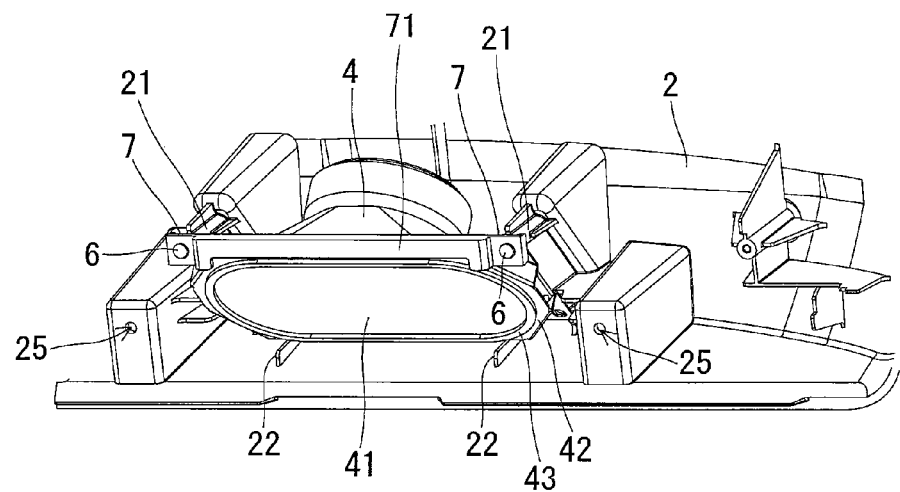
FIG. 5 is a perspective view showing the speaker in an attached state.

In contrast, a tip end surface 211 of each boss 21 is provided with a screw hole 212. The screw 6 passes through the through-hole 421 of the frame 42 and is screwed into the screw hole 212. The frame 42 is thereby fixed to the boss 21 with the attaching surface 422 thereof in surface contact with the tip end surface 211 of the boss 21 around the screw 6, and the speaker 4 is thereby attached to the back cabinet 2 as shown in FIG. 5.

Figure 9:
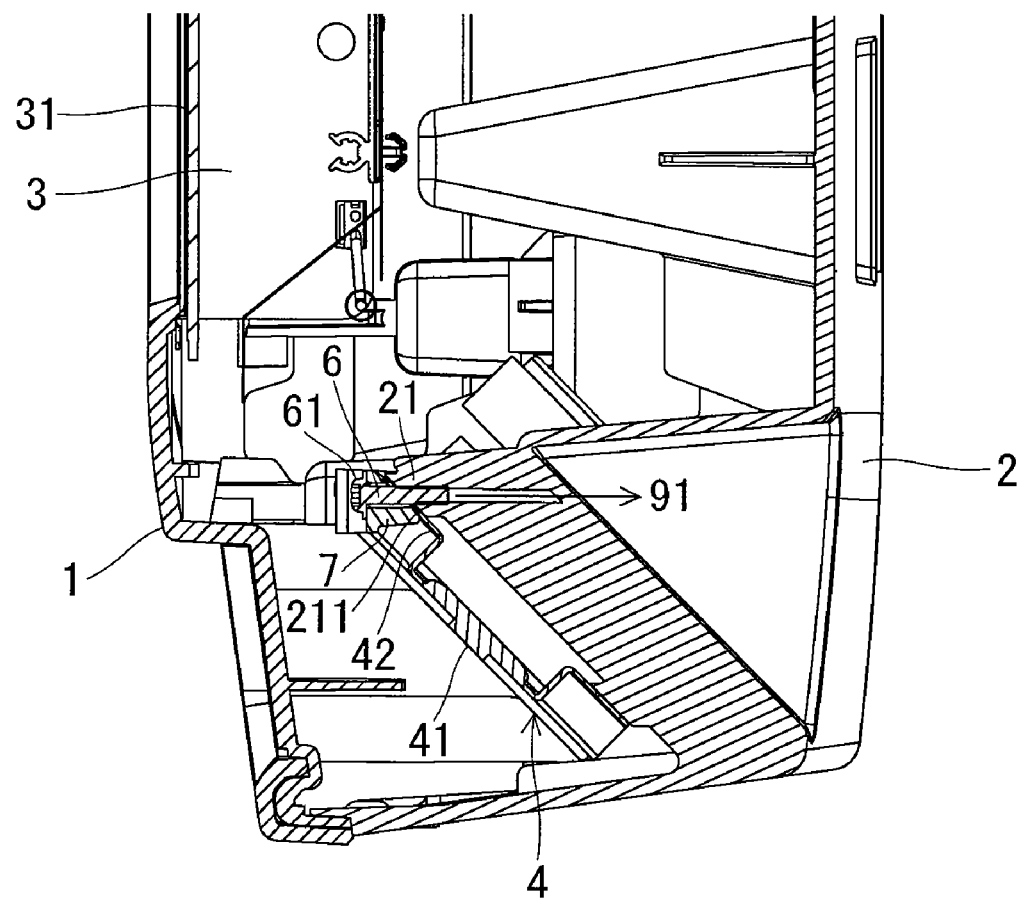
FIG. 9 is an enlarged view of an A area shown in FIG. 8.
Figure 10:
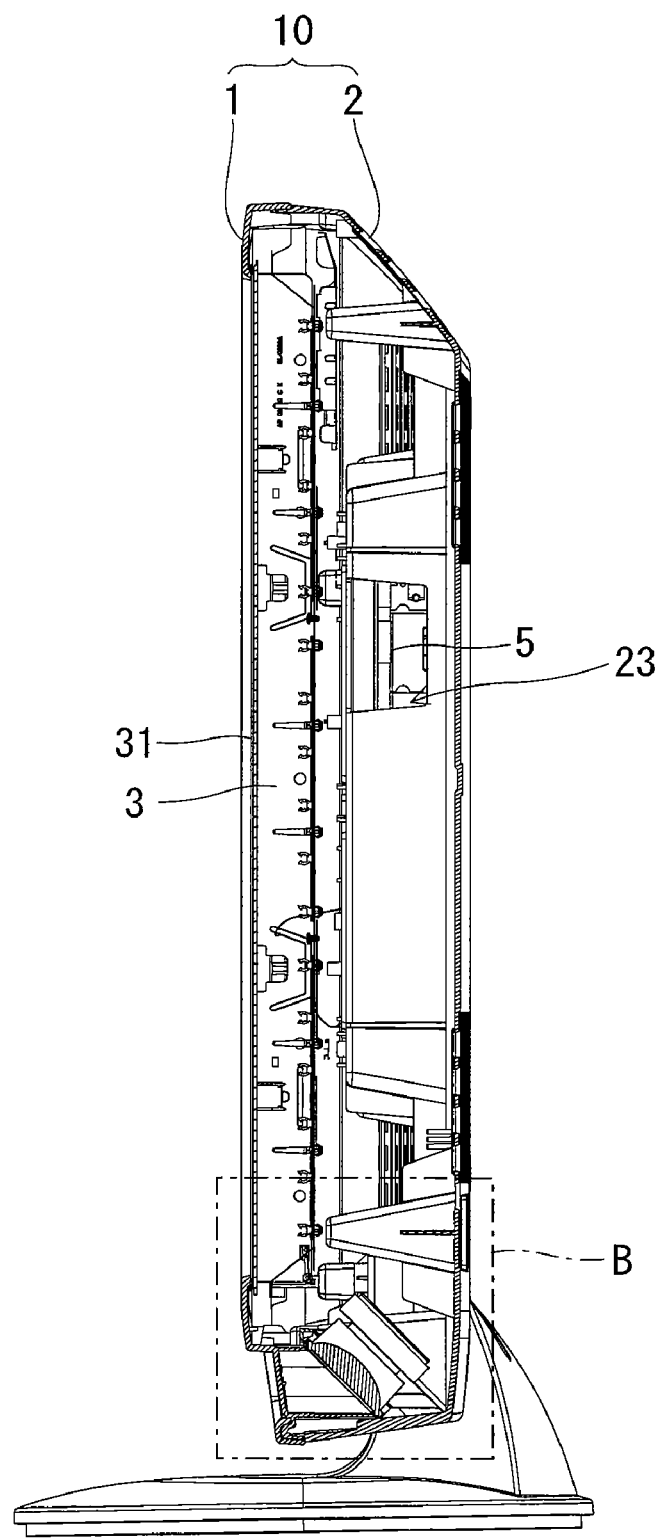
FIG. 10 is a vertical cross-sectional view of the liquid crystal display television receiver along a line passing through a rib formed on the inner surface of the back cabinet.

Also, as shown in FIGS. 4 and 9, the tip end surface 211 of each boss 21 is inclined with respect to a screw-in direction 91 of the screw 6, and faces a lower side of the display screen 31 of the liquid crystal display panel 3. Therefore, the speaker 4 fixed to the right and left pair of boss 21, 21 has such a posture that the sound emitting surface 41 thereof is inclined with respect to the display screen 31 of the liquid crystal display panel 3, and faces the lower side of the display screen 31.

In this embodiment, the tip end surface 211 of the boss 21 is inclined with respect to the screw-in direction 91 so that the sound emitting surface 41 of the speaker 4 faces obliquely downward at 45 degrees with respect to the display screen 31 of the liquid crystal display panel 3.

Figure 11:
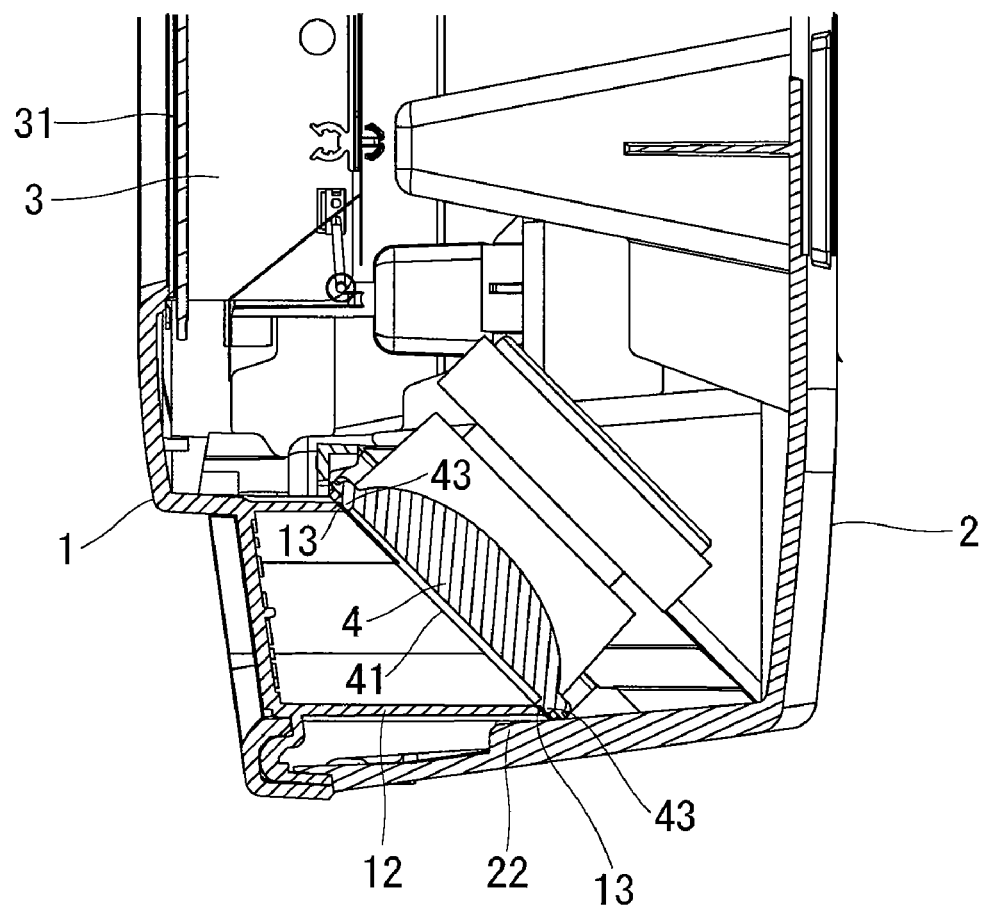
FIG. 11 is an enlarged view of a B area shown in FIG. 10.

Even in a case where the speaker 4 is attached to the back cabinet 2 with the sound emitting surface 41 thereof inclined as described above, since the speaker 4 is arranged in a space formed between the liquid crystal display panel 3 and the back cabinet 2 as shown in FIG. 11, the speaker 4 and the liquid crystal display panel 3 do not interfere with each other.

As shown in FIG. 4, a spacer 7 made of resin intervenes between each of the pair of screws 6, 6 to be screwed into the right and left pair of bosses 21, 21 and the frame 42. As shown in FIG. 9, each spacer 7 includes surface regions to be in surface contact with facing surfaces of a head 61 of a corresponding screw 6 and the frame 42 to each other.

Figure 6:
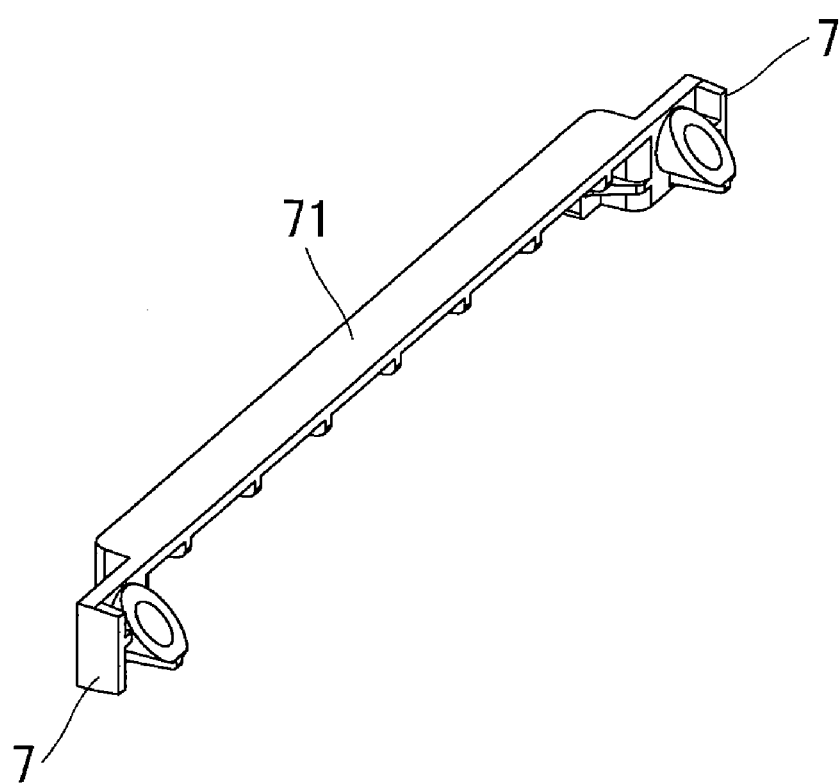
FIG. 6 is a perspective view showing a spacer which is one of attaching components of the speaker.

Also, as shown in FIGS. 4 and 6, a pair of spacers 7, 7 to be attached to each speaker 4 is connected to each other by a connection member 71 made of resin, and is formed integrally with the connection member 71.

As shown in FIGS. 5 and 11, on the inner surface of the back cabinet 2, further formed is a right and left pair of ribs 22, 22 to be abutted by a lower end of an outer edge surrounding the sound emitting surface 41 of the speaker 4. That is, the outer edge of the speaker 4 abuts on the pair of ribs 22 at positions opposite to screwing positions of the frame 42. In other words, the frame 42 provided to the speaker 4 is screwed to the pair of bosses 21, 21 at positions opposite to the right and left pair of ribs 22, 22.

As shown in FIG. 2, a plurality of sound emitting holes 11 through which an acoustic wave from each speaker 4 should pass open in the front surface of the front cabinet 1 below the display screen 31 of the liquid crystal display panel 3 at positions opposed to the speakers 4.

Figure 7:
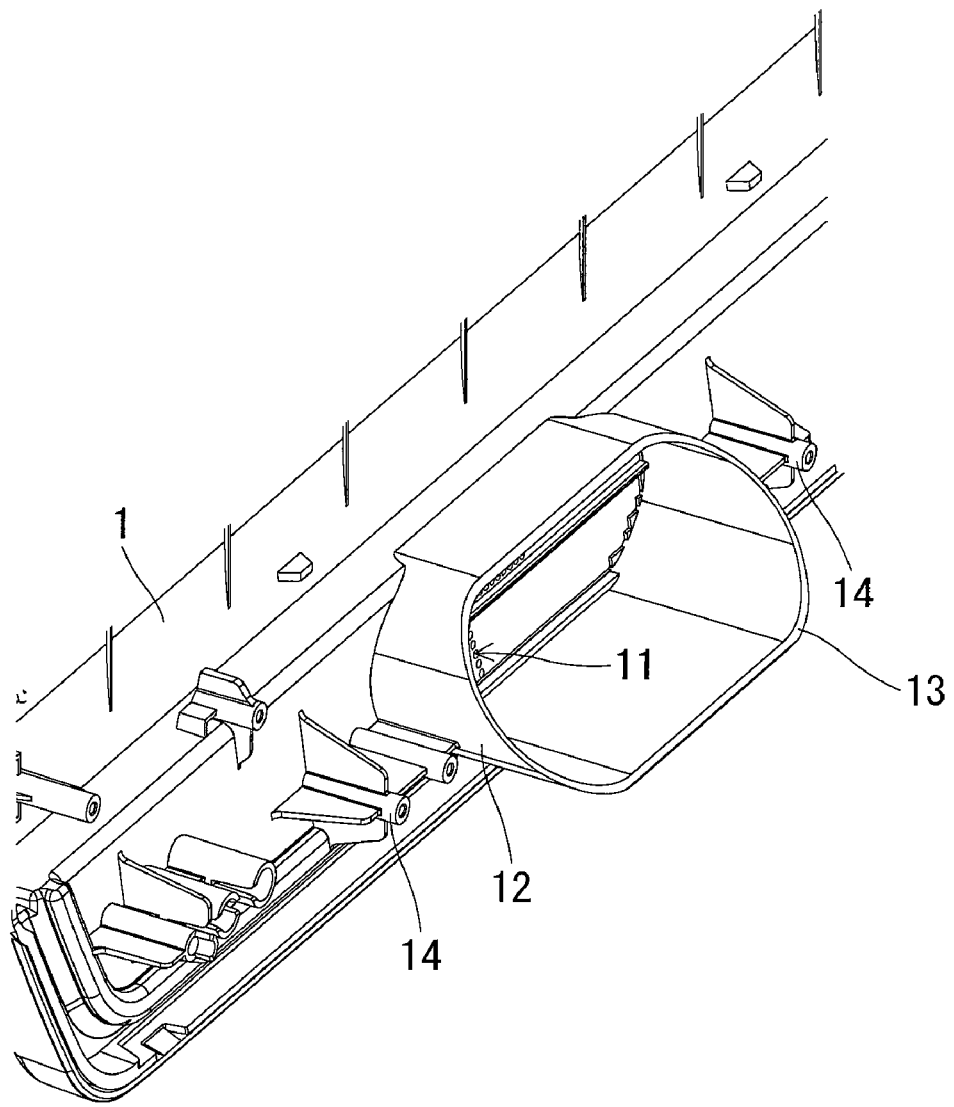
FIG. 7 is a perspective view showing a duct through which an acoustic wave from the speaker passes and a pair of bosses projecting on both sides of the duct.
Figure 8:
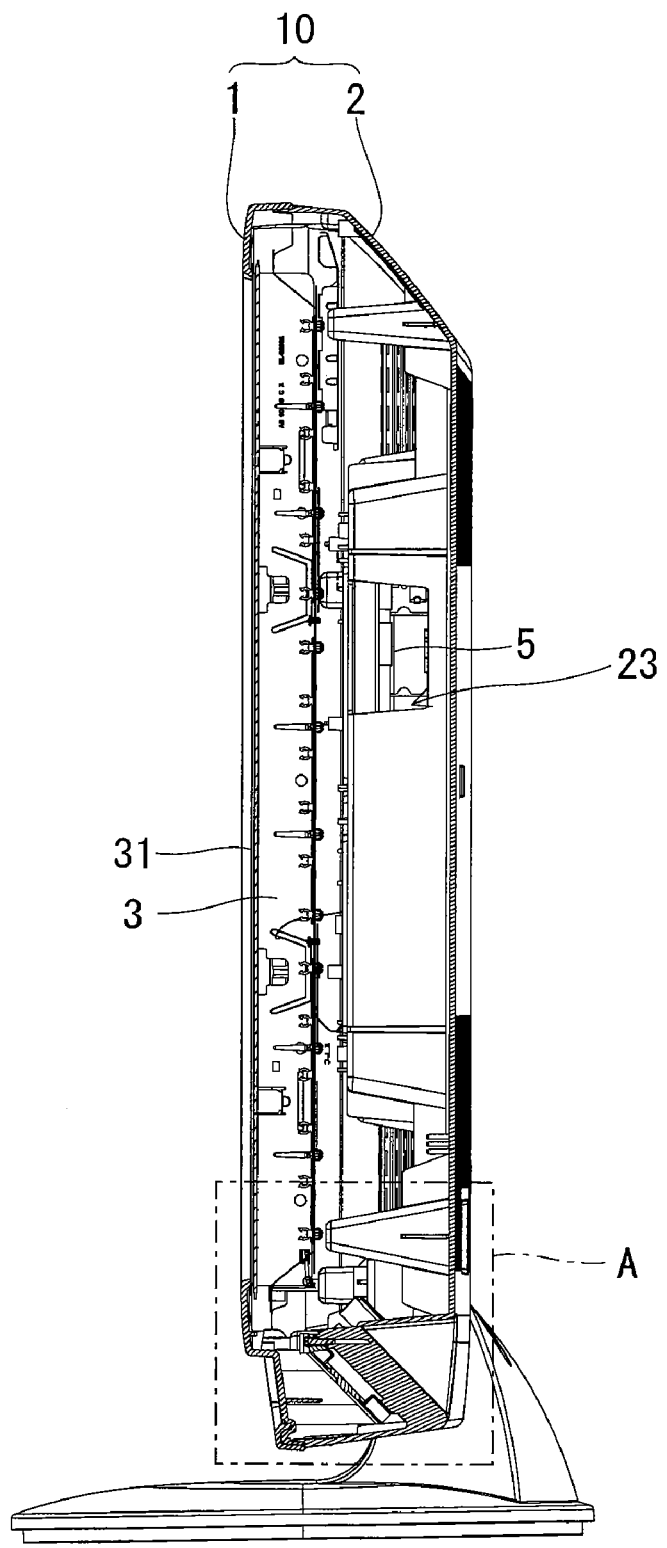
FIG. 8 is a vertical cross-sectional view of the liquid crystal display television receiver along a line passing through a boss projecting on an inner surface of a back cabinet.

As shown in FIG. 7, a duct 12 projects on the rear surface of the front cabinet 1 at a position opposed to the speaker 4, namely in a region where the plurality of sound emitting holes 11 open, so as to surround the plurality of sound emitting holes 11 in said region. Therefore, a space inside the duct 12 communicates with the plurality of sound emitting holes 11 in the region where the duct 12 projects.

Also, the duct 12 includes an open-end tip end surface 13 generally parallel to the sound emitting surface 41 of the speaker 4 attached to the back cabinet 2. As shown in FIG. 11, an entire surface of the open-end tip end surface 13 is in close contact with a surface of a gasket 43 (refer also to FIGS. 4 and 5) surrounding the sound emitting surface 41 of the speaker 4.

Therefore, a large part of the acoustic wave emitted from the sound emitting surface 41 of the speaker 4 is transmitted to the sound emitting holes 11 through the space inside the duct 12, and is emitted forward from the sound emitting holes 11.

Further in this embodiment, in order to improve closeness of the contact between the open-end tip end surface 13 of the duct 12 and the surface of the gasket 43, a pair of bosses 14, 14 for fastening the front cabinet 1 and the back cabinet 2 in combination projects on either side of the duct 12, namely either side of an attaching position of the speaker 4 on the rear surface of the front cabinet 1 as shown in FIG. 7. As shown in FIG. 5, the back cabinet 2 is provided with a through-hole 25 corresponding to each boss 14, and screws 6, 6 pass through the respective through-holes 25, 25, and are screwed into the respective bosses 14, 14 as shown in FIG. 3.

Therefore, by using fastening power of both the cabinets 1, 2 by screwing, it is possible to improve the closeness of the contact between the open-end tip end surface 13 of the duct 12 projecting on the rear surface of the front cabinet 1 and the surface of the gasket 43 surrounding the sound emitting surface 41 of the speaker 4. As a result, the acoustic wave from the speaker 4 is transmitted to the sound emitting holes 11 with very little leak from the duct 12, and is emitted forward from the sound emitting holes 11.

The liquid crystal display television receiver described above is manufactured by performing a first component attachment step of attaching various components such as the liquid crystal display panel 3 and the like to the front cabinet 1, a second component attachment step of attaching various components such as the circuit board 5 and the like to the back cabinet 2, and a housing forming step of combining the front cabinet 1 and the back cabinet 2 to form the housing 10. Here, in the housing forming step, required is a complicated work for connecting the various components on the front cabinet 1 side (mainly the liquid crystal display panel 3) and the various components on the back cabinet 2 side (mainly the circuit board 5) to each other via a lead wire.

However, in the liquid crystal display television receiver described above, since the speaker 4 is attached to the back cabinet 2 in the second component attachment step, it is possible to connect the speaker 4 and the circuit board 5 to each other via the lead wire in this step.

Therefore, the number of works required in the housing forming step decreases, and workability at the time of manufacturing the liquid crystal display television receiver improves in comparison with the conventional liquid crystal display television receiver in which the speaker 4 is attached to the front cabinet 1.

Also, in the liquid crystal display television receiver described above, the speaker 4 has such a posture that the sound emitting surface 41 thereof is inclined with respect to the display screen 31 of the liquid crystal display panel 3 and faces a lower side of the display screen 31. Therefore, a width of the sound emitting surface 41 apparently decreases in a direction downward from an edge of the display screen 31 along the front surface of the housing 10. Thus, a width of the region where the plurality of sound emitting holes 11 are formed along said direction can be reduced. As a result, the area of the region where the plurality of sound emitting holes 11 are formed is reduced, and the proportion of the area occupied by the display screen 31 on the front surface of the housing 10 increases.

Further, in the liquid crystal display television receiver described above, the tip end surface 211 of the boss 21 for fixing the frame 42 provided to the speaker 4 is inclined with respect to the screw-in direction 91 of the screw 6, and faces the lower side of the display screen 31 of the liquid crystal display panel 3. Therefore, the speaker 4 fixed to the boss 21 has such a posture that the sound emitting surface 41 thereof is inclined with respect to the display screen 31 of the liquid crystal display panel 3 even if the frame provided to the speaker is not bent at a predetermined angle like the conventional liquid crystal display television receiver. Accordingly, the versatility of the speaker improves, and as a result, the cost can be reduced.

Also, in the liquid crystal display television receiver described above, in the attachment of the speaker 4 to the back cabinet 2, the frame 42 placed on the tip end surface 211 of each boss 21 has a facing surface to the head 61 of the screw 6, and this facing surface is inclined with respect to the screw-in direction of the screw 6.

Because of this, in a case where there is no spacer 7 in the above described liquid crystal display television receiver, an edge of the head 61 of the screw 6 is in point contact or line contact with the facing surface of the frame 42. Therefore, a screwing force of the screw 6 is transmitted disproportionately to the frame 42 around the screw 6, and a part of the frame 42 might thereby rise from the tip end surface 211 of the boss 21.

However, in the liquid crystal display television receiver described above, the spacer 7 intervenes between facing surfaces of the head 61 of the screw 6 and the frame 42 to each other, and surfaces of the spacer 7 are in surface contact with said facing surfaces. Therefore, the screwing force of the screw 6 is transmitted to the frame 42 equally through the spacer 7 around the screw 6. Thus, the speaker 4 can be fixed to the boss 21 with the frame 42 in surface contact with the tip end surface 211 of the boss 21.

Furthermore, like the above described liquid crystal display television receiver, in a case where the speaker 4 is screwed to the pair of bosses 21, 21 only at positions on one side (positions near the upper end of the sound emitting surface 41), a portion of the speaker 4 on the opposite side to the screwing positions will rise from the position where the speaker 4 should be fixed.

However, in the liquid crystal display television receiver described above, the right and left pair of ribs 22, 22 is formed at positions on the opposite side to the screwing positions, and the lower end of the outer edge surrounding the sound emitting surface 41 of the speaker 4 abuts on the pair of ribs 22, 22. Therefore, the speaker 4 is restrained from rising by the pair of ribs 22, 22.

Accordingly, the number of screws 6 required for the fixation of the speaker 4 decreases, and as a result, workability at the time of attachment of the speaker 4 to the back cabinet 2 improves.

The present invention is not limited to the foregoing embodiment in construction but can be modified variously within the technical range set forth in the appended claims. For example, various configurations employed in the liquid crystal display television receiver described above can be employed in a liquid crystal display television receiver in which the speaker 4 is arranged at a position near a side end or an upper end of the liquid crystal display panel 3, as well as the liquid crystal display television receiver in which the speaker 4 is arranged at the position near the lower end of the liquid crystal display panel 3.

In such a liquid crystal display television receiver, the sound emitting holes 11 through which the acoustic wave from the speaker 4 should pass open in at least a part of the region surrounding the display screens 31, such as a lateral region, an upper region or the like of the display screen 31 of the liquid crystal display panel 3 depending on the attachment position of the speaker 4. Also, on the boss 21 for fixing the speaker 4, depending on the attachment position of the speaker 4, the tip end surface 211 which faces outside of the display screen 31 is formed, such as lateral side or upper side of the display screen 31. Therefore, the speaker 4 fixed to the pair of bosses 21, 21 has such a posture that the sound emitting surface 41 thereof is inclined with respect to the display screen 31 of the liquid crystal display panel 3 and faces outside of the display screen 31.

Also, two speakers 4 are arranged inside the housing 10 in the liquid crystal display television receiver described above. However, the present invention is not limited to this, and one or more than three speakers 4 may be arranged inside the housing 10.

Further, the pair of spacers 7, 7 attached to each speaker 4 is formed integrally with the connection member 71 made of resin in the liquid crystal display television receiver described above. However, the present invention is not limited to this, and the pair of spacers 7, 7 may be separated from each other.

Furthermore, the pair of bosses 14, 14 for fastening the front cabinet 1 and the back cabinet 2 in combination projects on the rear surface of the front cabinet 1 in the liquid crystal display television receiver described above. However, the present invention is not limited to this, and the pair of bosses 14, 14 may project on the inner surface of the back cabinet 2. In this case, the screws 6, 6 pass through the front cabinet 1, and are screwed into the pair of bosses 14, 14.

The present invention can be applied to various image display devices including a flat display panel such as a plasma display panel or the like as well as the liquid crystal display television receiver.

What is claimed is:

1. An image display device comprising: a housing comprising a front cabinet and a back cabinet; a flat display panel arranged inside the housing; a speaker which is arranged inside the housing and emits voice forward; and a circuit board which is arranged inside the housing and which displays an image on the flat display panel and transmits an audio signal to the speaker, wherein the flat display panel is attached to the front cabinet while the speaker and the circuit board are attached to the back cabinet, a sound emitting hole through which an acoustic wave from the speaker should pass is formed in at least a part of a region surrounding a display screen of the flat display panel on a front surface of the front cabinet, and the speaker has such a posture that a sound emitting surface thereof is inclined with respect to the display screen of the flat display panel and faces outside of the display screen; wherein a tube section including an inner space communicated with the sound emitting hole projects on a rear surface of the front cabinet, and an open-end tip end surface of the tube section is in close contact with an outer edge part surrounding the sound emitting surface of the speaker; and wherein at least one pair of bosses for fastening both the cabinets in combination projects on both sides of attachment position of the speaker on an inner surface of either of the front cabinet and the back cabinet, and screws pass through the other cabinet, and are screwed into the pair of bosses respectively.

2. The image display device according to claim 1, wherein the speaker is provided with a frame for attaching the speaker to the back cabinet, one or more bosses for fixing the frame project on an inner surface of the back cabinet toward the front cabinet side, a screw passes through the frame and is screwed into each boss, a tip end surface of the boss is inclined with respect to a screw-in direction of the screw and faces outside of the display screen of the flat display panel.

3. The image display device according to claim 2, wherein between facing surfaces of a head of the screw and the frame to each other, a spacer including surface regions to be in surface contact with both the facing surfaces intervenes.

4. The image display device according to claim 2, wherein a rib to be abutted by a part of an outer edge surrounding the sound emitting surface of the speaker is formed on the inner surface of the back cabinet, and the speaker is screwed to the boss at a position opposite to the rib.

* * * * *